United States Patent Office 3,425,158
Patented Feb. 4, 1969

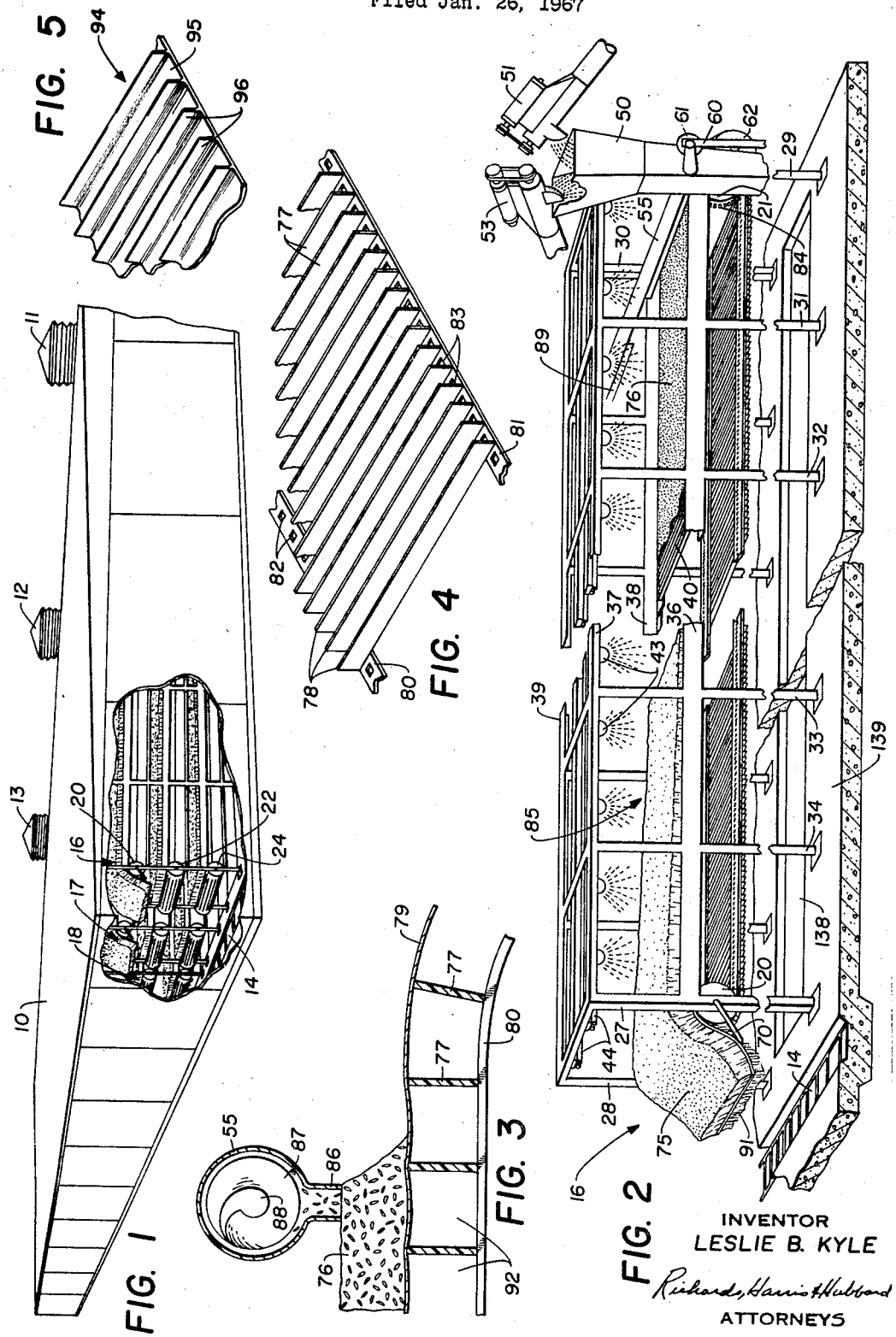

3,425,158
CULTURE BELT FOR A HYDROPONIC SYSTEM
Leslie B. Kyle, 4604 Bluff Road,
Indianapolis, Ind. 46217
Filed Jan. 26, 1967, Ser. No. 612,028
U.S. Cl. 47—1.2          5 Claims
Int. Cl. A01g *31/00*

ABSTRACT OF THE DISCLOSURE

An improved culture belt for supporting a hydroponic growth mat, which permits ready removal of said mat at the point of harvesting the same.

---

This invention relates to hydroponic cultivation of plants wherein germination and growth are stimulated under controlled nutrition soilless environment, and more particularly, but not by way of limitation, to a culture belt for use in such a system.

In U.S. Patent 2,971,290 and U.S. Patent application Ser. No. 391,660, filed Aug. 24, 1964, for "A Continuous Hydroponic System," now U.S. Patent No. 3,284,948, a continuous seedbed operation is disclosed. The present invention represents an improvement over the system disclosed in each of the above-identified patents and relates to the provision of a culture belt for use in a continuous seedbed operation. In both of the systems disclosed in the above patents, a culture belt is moved through an irrigated growing zone. The belt supports a continuous cellulose sheet which in turn supports a bed of seed which is periodically soaked with a nutritional liquid causing the seeds to sprout and produce a green feed mass. The present invention may be generally described as an improvement on such a hydroponic system, the improvement comprising a culture belt having a plurality of upstanding, relatively closely spaced laterally extending ribs which support the cellulose strip across the tops thereof. In one embodiment, the ribs define therebetween and immediate the ends thereof openings through which nutritional liquid may flow and the roots from the germinating seeds may pass.

For a more complete understanding of the present invention and for further objects and advantages there, reference may now be had to the following description taken in conjunction with the accompanying drawings, in which:

FIGURE 1 is a perspective view partially broken away to illustrate one embodiment of the invention;

FIGURE 2 is a broken view of one of the tiered hydroponic units illustrated in FIGURE 1;

FIGURE 3 is a partial cross-sectional view taken along the input end of the unit illustrated in FIGURE 2;

FIGURE 4 is a partially broken away perspective view of one embodiment of the invention; and FIGURE 5 is a partially broken away perspective view of yet another embodiment of the invention.

Referring now to FIGURE 1, a hydroponic system is housed in the building 10 and supplied with seed from storage bins 11–13 for delivering a continuous supply of green sprouts, together with a rooted mat of seeds to an output conveyor 14.

As shown in the broken-away portion of FIGURE 1, the building houses a plurality of multitiered production units, units 16, 17, and 18 of which are illustrated. Units 16–18 are of like construction, unit 16 including three tiers generally identified by the location of the rollers 20, 22 and 24 at the output station of the tier 16. Each of the rollers serves to provide support for a flexible culture belt upon which a continuous layer of seeds is deposited at the input end. The belt travels slowly from the input end to the output station during a predetermined growing season of the order of six or seven days. When a given segment of the belt reaches the output roller 20, the sprouted seeds are in the form of a lush, nutritious green feed mass. At the output station the green feed mass is removed from the belt and falls from the production unit onto conveyor 14 which transports the product to a point of use for shipment and ultimate consumption.

The mutitiered production unit 16 has been partially shown in FIGURE 2. Unit 16 includes a plurality of vertical and horizontal framing members which form an elongated, substantially open framework. The framework serves to support three sets of rollers which in turn support continuous belts on which seeds are deposited and on which a growth is ultimately obtained. Since all three tiers of unit 16 are identical in structure, only the upper tier is illustrated and will be described. The upper tier includes rollers 20 and 21. Roller 20 is mounted on the left end of frame 16 and roller 21 is mounted at the right end of frame 16. The roller 20 is journaled in the end uprights 27 and 28, and the roller 21 is journaled in the end uprights 29 and 30. Intermediate side supports, such as supports 31–34, together with companion supports on the opposite side form a framework which is interconnected by longitudinal horizontal struts, such as struts 36–39. The struts 36 and 38 which are L-shaped in cross section serve to provide vertical support for culture belt 40 which supports the seedbed. Struts 37 and 39 provide support for a plurality of sprinklers, such as sprinklers 43, and a plurality of lights, such as lights 44. Preferably the lights 44 are fluorescent lights which serve to provide stimuli to the seedbed.

Adjacent to the input end of production unit 16 is a supply hopper 50 which is maintained full of seed delivered by way of a conveyor 51. Return conveyor 53, the function of which will be explained hereafter, also empties into the supply hopper 50. Communicating with supply hopper 50 is a horizontally disposed seed conveyor 55 which is positioned above roller 21. Conveyor 55 includes an internal power-driven spiral screw 87 which serves to deliver seed from hopper 50 to the tiered units across which the conveyor extends. Screw 87 in the conveyor 55 forces seed from the hopper 50 into and through conveyor 55. Adjacent to the hopper 50 is a support 60. Motor 61 is mounted to support 60 and coupled by a suitable drive belt (not illustrated) to the screw in conveyor 55.

Also supported by support 60 is a roll 62 of a suitable perforated paper. The roll of paper 62 is fed automatically onto belt 40 as belt 40 passes over roller 21 to provide a suitable membrane onto which seeds may be deposited from the conveyor 55. The paper is preferably of the type described in U.S. Patent 2,971,290.

At the output station a stripping panel 70 extends parallel to the roller 22. The panel 70 is supported from the end members 27 and 28 by suitable brackets so that one end of stripper panel 70 is adjacent the surface of roller 20. Thus, as a seedbed having a growth of roots and stems reaches the roller 20 at the output station, the seedbed and paper mat are lifted from the belt 40 and travel downward onto a conveyor 14. Conveyor 14 extends laterally across the end of unit 16 and across other units adjacent thereto. As seen in FIGURE 2, a mat of sprouts, seeds and roots 75 issues from the upper belt 40 as it passes over roller 20 and blade 70.

Conveyor 55 is shown in sectional view in FIGURE 3 together with a short portion of the belt 40 which supports the seedbed 76. Belt 40, as shown in FIGURE 4, includes a plurality of upstanding, relatively closely spaced laterally extending ribs 77 which support across the tops 78 thereof a paper or cellulose strip 79 fed onto rib 77 from paper roll 62. Attached to the bottom of and disposed transversely across each end of ribs 77 are elongate, relatively narrow, continuous bands 80 and 81 provided with apertures 82 and 83, respectively, between adjacent pairs of ribs 77. Bands 80 and 81, as illustrated in FIGURE 2, are slidably supported by struts 36 and 38. Belt 40 is moved through production unit 16 by sprocket means, such as roller 21 which is provided with projections or teeth 84 disposed about the periphery of roller 21 at each end thereof. Projections 84 pass through and engage apertures 82 and 83 to drive belt 40 through production unit 16 by use of motor means (not illustrated) connected in a conventional manner to roller 21. Belt 40 is continuous, as illustrated in FIGURE 2, and upon completing its pass through the irrigated growing zone of unit 16, generally indicated by the reference numeral 85, and passing over roller 20 will return beneath the growing zone 85 to roller 21. As belt 40 passes over roller 21, ribs 77 will contact paper 79 and support it on the tops 78 thereof. As illustrated in FIGURE 3, conveyor 55 has a downwardly extending spout section 86 through which seeds driven by screw 87 on a shaft 88 may pass. The seeds will be deposited onto the paper 79 to a depth dependent upon the elevation of the mouth of the spout 86 above the paper 79. The screw 87 is driven at constant speed so that the seeds will continuously move therethrough and provide a continuous feed supply.

The spout 86 extends lengthwise of the conveyor 55 for registration with belt 40. Similarly, a second spout 89 extends from conveyor 55 for registration with a belt 40 on an adjacent production unit 17. Conveyor 55 may of course extend across and supply seed to any given number of tiered production units. Conveyor 55 may run continuously during any time interval that the conveyor belt 40 is moving and any excess amounts of seed in conveyor 55 not delivered onto belts 40 may be delivered to an overflow hopper (not illustrated) from which it may be returned to supply hopper 50 through conventional conveyor 53.

After seed is deposited on paper 79, as illustrated in FIGURE 3, belt 40 progresses through production unit 16 where it will be sprayed with a suitable nutritional fluid from sprinklers 43 which together with lights 44 will induce growth of the seedbed 76 causing sprouts 91 to pass through paper 79. Ribs 77 of belt 40 define therebetween, intermediate opposite ends, openings generally indicated by the reference numeral 92 to accommodate the spout growth as well as permit liquid from sprays 43 to pass through the seedbed onto the tier immediately below, thus permitting full utilization of all nutritional fluid sprayed onto seedbed 76. Since belt 40 is not formed of a foraminous or mesh-like material, sprouts 91 will not become intertwined with such a material permitting easy removal of mat 75 at the output end of production unit 16.

Production unit 16 may be formed, as illustrated in FIGURE 1, of a three tiered unit, all three tiers of which will be identical in construction to top tier illustrated in FIGURE 2.

As shown in FIGURE 2, a vat 93 is located beneath each multitiered unit. The nutrient-bearing fluids sprayed onto the belts 40 in each unit flow by gravity down into the vat. An irrigation system (not illustrated) has a suitable pump leading to the spray heads 43, the pump inlet leading from the vat 138. The vat has a flow connection leading to a water source so that make-up water may be supplied at the vat. Nutrition may be added to the water in accordance with various known criteria. A suitable plant nutrient may be such as manufactured and sold as Plant Nutrient 75—a by Hydroponics, Inc., Indianapolis, Ind.

Suitable control means, not illustrated, are provided for controlling the level of seed in supply hopper 50 to prevent overflow and for controlling the rate at which belt 40 traverses the irrigated growing zone 85, as well as the rate at which conveyor 55 delivers seed to the various belts 40. Suitable means may also be employed to move belt 40 a given distance at desired time intervals if continuous operation is not desired, and to supply make-up water to vat 138 in foundation 139.

By way of example, a unit capable of producing 60 tons of green feed per day would include twenty multitiered units. Each unit would be 96 feet long and 6 feet wide. Each unit would have three belts. The enclosure 10 preferably would be compartmented so that the first one-fourth of the traverse of each belt run would be maintained at about 85° F. The remaining portion would be maintained at a temperature from 68° F. to 70° F. Grain would be deposited onto each belt approximately 1½ inches deep, which corresponds with about 100 pounds seed grain for each six-by-twelve foot area. The belts are operated preferably intermittently to remove about twelve feet of growth each day at the output station from each belt. Unloading at the output and simultaneously loading at the input would require an hour operating interval per day. One hundred pounds of grain would yield about 1,000 pounds of forage and grain in a 7-day growing interval. The belts 40 may be formed of any suitable material, such as a rubber or plastic, rigid enough to support a seedbed 76 upon ribs 77 and flexible enough to pass over rollers 20 and 21. While sprocket means are utilized in the embodiment illustrated to drive belt 40, it may be frictionally driven by providing suitable idler wheels or rolls, though the embodiment illustrated in FIGURE 4 is preferred.

In FIGURE 5, an alternative culture belt 94 is illustrated. Belt 94 consists of a continuous band 95 provided with a plurality of relatively closely spaced laterally extending ribs 96 which support the cellulose paper 79 and seedbed 76 in the same manner as the belt illustrated in FIGURE 4. Belt 94 may be frictionally driven over rollers like rollers 20 and 21, but roller 21 need not be provided with teeth 84. However, belt 94 may be provided with apertures along the edges to permit use of a roller having teeth 84. Belt 94 may also be provided with a plurality of apertures between ribs 96 to permit nutritional fluid to flow through the belt 94 onto the belt therebelow, or into vat 138.

Having described the invention in connection with certain specific embodiments thereof, it is to be understood that further modifications may now suggest themselves to those skilled in the art, and it is intended to cover such modifications as fall within the scope of the appended claims.

What is claimed is:
1. In a hydroponic system where a culture belt is moved through an irrigated growing zone, the belt being covered with a cellulose strip which supports seeds thereon, the improvement comprising:
    a culture belt having plurality of upstanding, relatively closely spaced laterally extending ribs for supporting the cellulose strip across the tops thereof.
2. The apparatus of claim 1, wherein:
    the ribs of said belt define therebetween and intermediate the ends thereof openings through which a liquid may flow and roots from said seeds may pass.
3. The apparatus of claim 2, wherein:
    an elongate, relatively narrow continuous band is at- tached to the bottom of and disposed transversely across each end of said ribs.

4. The apparatus of claim 3, wherein at least one of said bands is provided with a plurality of apertures each of which is positioned between an adjacent pair of ribs and said apparatus includes:

sprocket means for driving said belts, the projections on said sprocket means being adapted to pass through and engage a number of said apertures in said belt for driving the same through said irrigated growing zone.

5. The apparatus of claim 4, including:

parallel, horizontally disposed track means for supporting each of said bands and thereby said belt as it passes through said irrigated growing zone.

References Cited

UNITED STATES PATENTS

| | | | |
|---|---|---|---|
| 1,793,626 | 2/1931 | McCormick | 47—17 |
| 2,358,000 | 9/1944 | Cornell | 47—1.2 X |
| 2,639,549 | 5/1953 | Wubben et al. | 47—1.2 |
| 2,971,290 | 2/1961 | Kyle | 47—1.2 |
| 3,284,948 | 11/1966 | Kyle | 47—1.2 |
| 3,300,896 | 1/1967 | Lunstroth | 47—1.2 |

ROBERT E. BAGWILL, *Primary Examiner.*

U.S. Cl. X.R.

226—170